Figure 1:
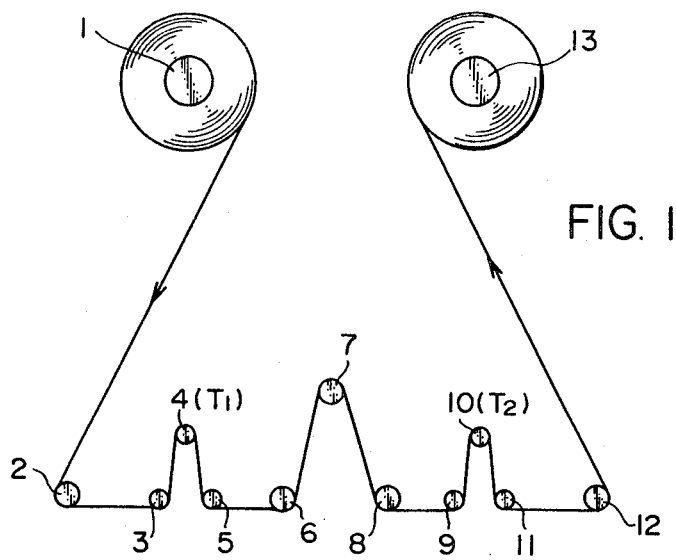

United States Patent [19]

Horie et al.

[11] 4,421,887
[45] Dec. 20, 1983

[54] BIAXIALLY ORIENTED POLYESTER FILMS

[75] Inventors: Shigeru Horie; Takamasa Asano; Tetsuo Ichihashi, all of Matsuyama; Hideo Katoh, Kanagawa, all of Japan

[73] Assignee: Teijin, Limited, Osaka, Japan

[21] Appl. No.: 380,433

[22] Filed: May 20, 1982

[30] Foreign Application Priority Data

May 27, 1981 [JP] Japan .................................. 56-79121

[51] Int. Cl.³ .............................................. C08K 5/10
[52] U.S. Cl. .................................. 524/317; 264/235.6
[58] Field of Search ............... 524/317, 308, 311, 314; 264/235.6

[56] References Cited

U.S. PATENT DOCUMENTS 3,516,957  6/1970  Gray, Jr. et al. .................... 524/315
4,093,695  6/1978  Heirbaut ........................... 264/235.6

Primary Examiner—Joseph L. Schofer
Assistant Examiner—Judy Reddick
Attorney, Agent, or Firm—Wenderoth, Lind & Ponack

[57] ABSTRACT

A biaxially oriented polyester film composed of a polyester composition comprising (A) 100 parts by weight of a substantially linear polyalkylene terephthalate having ethylene terephthalate as a main structural component, (B) 0.01 to 5 parts by weight of an ester of an aliphatic polyol having at least 4 hydroxyl groups in the molecule with an aliphatic monocarboxylic acid having at least 8 carbon atoms, and (C) not more than 0.8 part by weight of fine inorganic particles having an average particle diameter of not more than about 1 micron and being substantially insoluble in the polyalkylene terephthalate. The aforesaid biaxially oriented polyester film is useful as a base of magnetic tapes.

7 Claims, 2 Drawing Figures

BIAXIALLY ORIENTED POLYESTER FILMS

This invention relates to a biaxially oriented polyester film, and more specifically, to a biaxially oriented polyester film having both surface flatness and slipperiness.

The demand for polyethylene terephthalate films has recently shown a striking increase, and with it, requirements for their quality have become more and more stringent. Presently, polyethylene terephthalate films find extensive use in various applications including magnetic applications as video tapes, computer tapes, floppy disks, audio tapes, etc., electrical applications as condensers, motor slot liners, electrical insulating tapes, etc., packaging applications as laminated films, vacuum metal-deposited films, etc., and other miscellaneous applications as X-ray radiographic films, microfilms, graphic arts, design charts, stamping foils, etc.

The properties required of the polyethylene terephthalate films differ depending upon their end uses. For example, in magnetic applications, base polyester films are required to have both surface flatness for preventing recording disturbances and slipperiness for the ease of film-forming operations and product handling.

Improvements on slipperiness have previously been attempted, for example, by a method which comprises adding particles of an inorganic material such as silicon oxide, titanium dioxide, calcium carbonate, talc or clay to polyesters; or a method which comprises precipitating fine particles containing calcium, lithium or phosphorus within the polymerization system during the synthesis of polyesters. When the resulting polyesters are formed into films, these fine inorganic particles form protrusions on the film surface to increase their slipperiness.

With such methods, the protrusions of the inorganic particles used in amounts which impart sufficient slipperiness will impair the flatness of the film surfaces. Hence, it is extremely difficult, if not impossible, to give films having both satisfactory surface flatness and slipperiness.

It is an object of this invention therefore to provide a biaxially oriented polyester film having both satisfactory surface flatness and slipperiness.

Another object of this invention is to provide a biaxially oriented polyester film having the aforesaid properties which contains an ester, preferably a partial ester, of a specified polyol with a specified aliphatic monocarboxylic acid.

Still another object of this invention is to provide a biaxially oriented polyester film which has equivalent slipperiness to, and much better flatness than, conventional polyester films containing fine particles alone for imparting slipperiness in spite of the fact that it contains a smaller proportion of the same fine particles as in the conventional polyester films.

Yet another object of this invention is to provide a biaxially oriented polyester film for use in the production of magnetic tapes having both satisfactory flatness and slipperiness.

A further object of this invention is to provide a biaxially oriented polyester film having excellent durability which can maintain its initial slipperiness even when repeatedly used.

Additional objects and advantages of this invention will become apparent from the following description.

These objects and advantages are achieved in accordance with this invention by a biaxially oriented polyester film composed of a polyester composition comprising (A) 100 parts by weight of a substantially linear polyalkylene terephthalate having ethylene terephthalate as a main structural component, (B) 0.01 to 5 parts by weight of an ester of an aliphatic polyol having at least 4 hydroxyl groups in the molecule with an aliphatic monocarboxylic acid having at least 8 carbon atoms, and (C) not more than 0.8 part by weight of fine inorganic particles having an average particle diameter of not more than about 1 micron and being substantially insoluble in the polyalkylene terephthalate.

Figure 2:
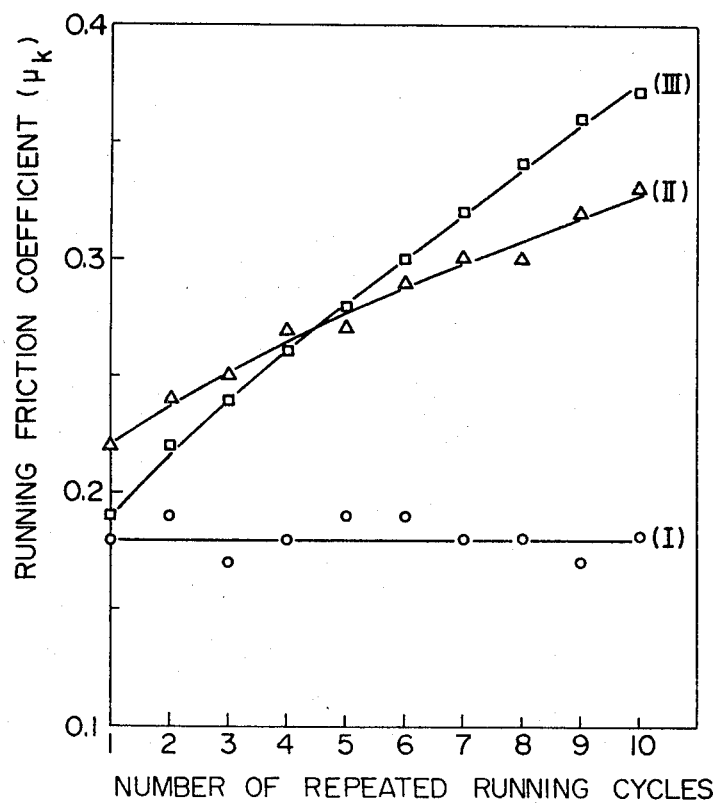

In the accompanying drawings:

FIG. 1 is a schematic view of a device used in measuring the running friction coefficient ($\mu_k$) of the film of this invention; and FIG. 2 is a graph showing the relation between the number of repeated running cycles and the running friction coefficient ($\mu_k$) which are measured on three different films by using the device shown in FIG. 1

The polyalkylene terephthalate (A) used in this invention is a substantially linear polyester derived from terephthalic acid as a main acid component and ethylene glycol as a main glycol component. In other words, this polyalkylene terephthalate has ethylene terephthalate as a main ester constituting component.

The polyalkylene terephthalate includes not only polyethylene terephthalate but also copolymers in which at least 80 mole% of the entire dicarboxylic acid component consists of terephthalic acid and at least 80 mole% of the entire glycol component consists of ethylene glycol.

Examples of dicarboxylic acids other than terephthalic acid as a comonomer include aromatic dicarboxylic acids such as isophthalic acid, naphthalenedicarboxylic acid, diphenoxyethanedicarboxylic acid, diphenyldicarboxylic acid, diphenyletherdicarboxylic acid, diphenylsulfonedicarboxylic acid, diphenylketonedicarboxylic acid and anthracenedicarboxylic acid; aliphatic dicarboxylic acids such as adipic acid and sebacic acid; and alicyclic dicarboxylic acids such as cyclohexane-1,4-dicarboxylic acid.

Examples of the diol forming the copolymers include polymethylene glycols having 3 to 10 carbon atoms such as trimethylene glycol, tetramethylene glycol, pentamethylene glycol, hexamethylene glycol and decamethylene glycol; alicyclic diols such as cyclohexane dimethanol; aromatic diols such as hydroquinone, resorcinol and 2,2'-bis(4-hydroxyphenyl)propane; aliphatic diols containing an aromatic nucleus such as 1,4-dihydroquinonemethylbenzene; and polyalkylene glycols(-polyoxyalkylene glycols) such as polyethylene glycol, polypropylene glycol and polytetramethylene glycol.

The copolymers may also include those which contain not more than 20 mole%, based on the total amount of the dicarboxylic acid and hydroxycarboxylic acid components, of a component derived from a hydroxycarboxylic acid, for example, aromatic hydroxycarboxylic acids such as p-hydroxybenzoic acid and aliphatic hydroxy acids such as $\omega$-hydroxycaproic acid. Furthermore, the copolymers may include those which contain copolymerized therein a trifunctional or higher carboxylic acid or hydroxy compound such as trimellitic acid or pentaerythritol in amounts which still maintain the copolymers substantially linear, for example in an amount of not more than 20 mole%.

The above polyalkylene terephthalates used in this invention are known per se and can be produced by methods known per se.

Polyethylene terephthalate is especially preferred as the polyalkylene terephthalate used in this invention.

Preferably, the polyalkylene terephthalates used in this invention have an intrinsic viscosity, determined at 35° C. for their o-chlorophenol solution, of about 0.5 to about 0.9.

The ester (B) used in this invention is an ester formed between an aliphatic polyol having at least 4 hydroxyl groups in the molecule and an aliphatic monocarboxylic acid having at least 8 carbon atoms.

Examples of the aliphatic polyol having at least 4 hydroxyl groups in the molecule are erythritol, threitol, pentaerythritol, arabitol, adonitol, talitol, sorbitol, mannitol and iditol.

Preferred aliphatic polyols are those having 4 to 6 hydroxyl groups in the molecule. Especially preferred aliphatic polyols have 5 or 6 carbon atoms.

Examples of the aliphatic monocarboxylic acid having at least 8 carbon atoms include caprylic acid, pelargonic acid, capric acid, undecylic acid, lauric acid, tridecanoic acid, myristic acid, pentadecanoic acid, palmitic acid, margaric acid, stearic acid, nonadecanoic acid, arachidic acid, heneicosanoic acid, behenic acid, tricosanoic acid, lignoceric acid, pentacosanoic acid, cerotic acid (hexacosanoic acid), heptacosanoic acid, montanic acid, nonacosanoic acid and melissic acid.

The aliphatic monocarboxylic acids are preferably linear and preferably have 8 to 30 carbon atoms.

The ester (B) used in this invention can be produced by a method know per se from the aliphatic polyol and the aliphatic monocarboxylic acid or its functional derivative such as an acid halide or acid anhydride. The esters (B) used in this invention include those in which all of the hydroxyl groups of the aliphatic polyol form an ester with the aliphatic monocarboxylic acid (complete esters) and those in which only some of the hydroxyl groups form an ester with the aliphatic carboxylic acid (partial esters). The partial esters are preferred in this invention, and mono-, di- or tri-esters are especially preferred.

It has previously been known that a complete ester of an organic acid having 8 to 25 carbon atoms with an alcohol having 1 to 10 carbon atoms is included in a polyester as a mold release agent in a polyester in order to facilitate the releasing of a polyester article from the mold (see U.s. Pat. No. 3,516,957 and British Pat. No. 1,261,369). The complete and partial esters used in this invention constitute part of the esters known from these prior art references. Accordingly, these patents are cited herein as references with regard to the esters (B) used in this invention. These prior patents, however, do not disclose or suggest that the specified ester (B) used in this invention can improve the surface flatness and slipperiness of biaxially oriented films of polyalkylene terephthalates having ethylene terephthalate as a main structural component.

We have found that a biaxially oriented film of polyethylene terephthalate containing, for example, a complete ester of glycerol and stearic acid (all of the three hydroxyl groups in the molecule of glycerol form an ester with stearic acid) cannot be evaluated as having fully satisfactory slipperiness. Our investigations show that the use of esters of polyols having at least 4, preferably 4 to 6, hydroxyl groups in the molecules with aliphatic monocarboxylic acids having at least 8, preferably 8 to 30, carbon atoms is necessary in order to obtain biaxially oriented polyester films, especially those which can be used favorably as magnetic tapes, and that biaxially oriented films of polyesters containing esters derived from alcohols having not more than 3 hydroxyl groups in the molecule or aliphatic monocarboxylic acids having not more than 7 carbon atoms do not have sufficient slipperiness; or they undergo coloration and do not show sufficient slipperiness because the low thermal stability of the esters tends to result in the thermal decomposition of the polyesters during film formation.

The amount of the ester (B) used in this invention is from 0.01 to 5 parts by weight, preferably from 0.05 to 4 parts by weight, per 100 parts by weight of the polyalkylene terephthalate. If the amount of the ester (B) is less than 0.01 part by weight, biaxially oriented films having sufficient slipperiness as contemplated by this invention cannot be obtained. If, on the other hand, it exceeds 5 parts by weight, the resulting biaxially oriented films undergo blocking and show reduced slipperiness.

The fine inorganic particles (C) used in this invention have an average particle diameter of not more than 1 micron, preferably about 0.1 to about 1 micron, especially preferably about 0.15 to about 0.5 microns, and are substantially insoluble in the polyalkylene terephthalate. In other words, the inorganic fine particles are present as undissolved fine particles in the biaxially oriented polyester film of the invention.

Preferred fine inorganic particles used in this invention include fine particles of inorganic acid salts such as phosphates, phosphites, carbonates, silicates, and sulfates of metals of Groups Ia, IIa, IIb or IIIb of the periodic table or salts of organic acids with inorganic bases, such as phosphonates, sulfonates or carboxylates of these metals; and oxides of metals of the 3rd to 6th periods of Groups II to IV of the periodic table or metals of the 4th to 6th periods of Groups V to VIII of the periodic table. Specific examples of these compounds are inorganic acid salts such as calcium phosphate, magnesium phosphate, calcium phosphite, magnesium phosphite, calcium carbonate, magnesium carbonate, calcium silicate, aluminum silicate, magnesium silicate, sodium sulfate, potassium sulfate, calcium sulfate, magnesium sulfate and barium sulfate; organic acid salts such as calcium phenylphosphonate, calcium benzylphosphonate, calcium benzenesulfonate, zinc benzenesulfonate, calcium p-toluenesulfonate, calcium or magnesium 5-sodiumsulfonatoisophthalate, and calcium magnesium, barium or zinc terephthalate, isophthalate, oxalate or benzoate; and oxides such as zinc oxide, alumina, silica, titanium dioxide, tin oxide, iron oxide and silica-alumina.

The fine inorganic particles, as referred to in this invention, can be included in the polyalkylene terephthalate in the form of particles having an average particle diameter of not more than about 1 micron. Or they can be formed in situ in the polycondensation system for polyester formation and thus included in the polyalkylene terephthalate. According to the latter method, fine particles containing calcium (or zinc), lithium and phosphorus by adding lithium acetate, calcium acetate (or zinc acetate) and phosphoric acid, phosphorous acid or an ester of phosphoric or phosphorous acid to the polycondensation reaction, for example at a relatively early stage of polycondensation.

The amount of the inorganic particles is not more than 0.8 part by weight per 100 parts by weight of the polyalkylene terephthalate. The preferred amount of the fine inorganic particles depends upon their particle diameter. Generally, the preferred amount of the fine particles within the above range can be increased as this particle diameter decreases. On the other hand, the preferred amount of the fine particles can be made smaller as their particle diameter becomes larger. For example, the preferred amount of fine particles having an average particle diameter of 0.3 micron is 0.8 part by weight at the largest, especially 0.1 to 0.5 part by weight. The preferred amount of fine particles having an average particle diameter of 0.8 micron is in the range of 0.02 to 0.3 part by weight.

The biaxially oriented polyester film of this invention can be produced by forming an unstretched film containing the components (A), (B) and (C), then stretching the film by a method known per se, for example stretching it consecutively (for example, stretching it first in the machine direction and then in a direction at right angles to the machine direction), or simultaneously (simultaneously stretching it both in the machine direction and a direction at right angles to the machine direction). For example, in the case of consecutive stretching, the film is stretched at 80° to 100° C. to 3 to 5 times in the machine direction, and then at 100° to 120° C. to 3 to 5 times in the direction perpendicular to the machine direction. The simultaneous stretching is effected, for example, by stretching it at 80° to 100° C. to 3 to 5 times simultaneously in the machine direction and the direction perpendicular thereto.

The unstretched polyester film can be produced by melt-molding a polyester composition composed of 100 parts by weight of the polyalkylene terephthalate, 0.01 to 5 parts by weight of the ester (B) and not more than 0.8 part by weight of the fine inorganic particles. The polyester composition is produced by mixing a melt of the polyalkylene terephthalate with the ester (B) and the fine inorganic particles with stirring. The polyester composition can also be produced by mixing a "master batch" polyester composition prepared in advance and containing the ester and/or the inorganic particles in amounts exceeding the above-specified limits with the polyalkylene terephthalate substantially free from the ester and/or the inorganic fine particles so that the amounts of the ester and/or the inorganic particles fall within the above-specified ranges.

Mixing of the polyalkylene terephthalate with the ester and/or the inorganic particles can be performed within a melt extruder, or in a polymerization reactor used for the formation of the polyalkylene terephthalate. Preferably, the ester is mixed within a melt extruder or in the relatively late or final stage of polycondensation in the polymerization reactor. It is desirable that the fine inorganic particles be present from the relatively early stage of polycondensation in the polymerization reactor.

The biaxially oriented polyester film of this invention shows equivalent slipperiness to conventional polyester films containing fine inorganic particles alone for imparting slipperiness in spite of the fact that it contains a smaller proportion of the same fine inorganic particles. Although no clear reason can be assigned to it, the present inventors theorize that the moderate exposure of the specified ester and the inorganic fine particles to the surface of the polyester film exerts favorable influences on the slipperiness of the film.

The biaxially oriented polyester film of this invention having equivalent slipperiness to the conventional polyester films has much better surface flatness than the conventional polyester films.

Since the biaxially oriented polyester film of this invention has excellent surface flatness and excellent slipperiness, its slipperiness in the initial stage is maintained for an extended period of time even when it is continuously and repeatedly used, and for example, a magnetic tape obtained by forming a magnetic recording layer on one surface of the film is substantially free from the printing on the magnetic recording layer of a rough pattern conforming to the fine particles on the other surface of the film, whch is said to be detrimental to magnetic recording.

According to this invention, therefore, a biaxially oriented polyester film for magnetic tapes is advantageously provided which is composed of a polyester composition comprising 100 parts by weight of polyethylene terephthalate, 0.05 to 4 parts by weight of an ester of an aliphatic polyol having at least 4 hydroxyl groups in the molecule with an aliphatic monocarboxylic acid having at least 8 carbon atoms, and not more than 0.5 part by weight of inorganic particles having an average particle diameter of not more than about 0.5 micron and being substantially insoluble in the polyethylene terephthalate.

The following examples illustrate the present invention in greater detail. All parts in these examples are by weight. The various properties and characteristics in the present invention are measured and defined as follows:

(1) Average particle diameter of the fine inorganic particles

It is measured by using a centrifugal particle size analyzer (Model CP-50, made by Shimadzu Seisakusho Ltd.) A particle size corresponding to 50 mass percent is read from the cumulative curve showing the relation between the particle sizes of the particles calculated on the basis of the resulting centrifugal sedimentation curve and the amounts of the particles present. The value read is defined as the average particle diameter of the fine inorganic particles [See a Japanese-language book entitled "Technique of Measuring Particle Sizes", published by Nikkan Kogyo Shimbun, 1975, pages 242–247.]

(2) Dynamic friction coefficient ($\mu_d$)

Friction between films was measured in accordance with ASTM-D-1894B.

(3) Running friction coefficient ($\mu_k$) of the film

It is measured by using the device shown in FIG. 2. In FIG. 1, the reference numeral 1 represents a pay-off reel; 2, a tension controller; 3, 5, 6, 8, 9 and 11, free rollers; 4, an inlet tension detector; 7, a fixed rod; 10, an outlet tension detector; 12, a guide roller; and 13, a take-up reel.

In an atmosphere kept at 20° C. and 60% RH, a film cut to a width of ½ inch is brought into contact at a winding angle ($\theta$) of $(152/180) \times \rho$ radian with the fixed rod 7 made of 18-8 stainless steel (SUS 27) and having an outside diameter of 20 mm and a surface roughness, CLA, of 0.3 micron. The film is then moved at a speed of 25 cm/sec to cause friction. The coefficient of running friction ($\mu_k$) is calculatd in accordance with the following equation in which $T_2$ in grams is the outlet tension detected by the outlet tension detector 10 which the tension controller 2 is adjusted so that the inlet tension $T_1$ detected by the inlet tension detector 4 is 30 g. The running friction coefficient $\mu_k$ in accordance with this invention is one obtained when the film is caused to travel over a distance of 90 meters.

$$\mu_k = \frac{1}{\theta} \ln \frac{T_2}{T_1} = 0.868 \log \frac{T_2}{30}$$

(4) CLA value of surface roughness

The CLA (center line average) value of a surface roughness is measured by the following method according to JIS B0601.

A surface-roughened film is measured by, for example, a needle pointer-type surface roughness tester made by Tokyo Seimitsu K. K. (SURFCOM 3B), and its film roughness curve is determined under a load of 70 mg using a needle with a radius of 2 μm and recorded on a chart on a scale of 50 times along the base line on the film and 50,000 times perpendicular to the plane of the film. From the profile roughness curve obtained by this measurement method, a portion corresponding to the measured length L (standard length 2 mm) is sampled. The portion of the profie curve is expressed by the equation Y=f(X), taking the center line of the portion as X axis and the direction of the vertical axis of the chart as Y axis, and CLA value is calculated from the following equation and expressed in microns.

$$CLA = \frac{1}{L} \int_0^L f(x)\,dx$$

The measurement is done on eight samples. The three largest values are excluded, and the average of the remaining five measured values is calculated and defined as CLA. The above measurement is done both in the longitudinal and transverse directions of the film, and the average of these is determined.

EXAMPLES 1 AND 2 AND COMPARATIVE EXAMPLES 1 AND 2

One hundred parts of polyethylene terephthalate having an intrinsic viscosity of 0.65 was dry-blended with 10 parts of pentaerythritol stearate, and the mixture was melt-extruded by an extruder at 280° C. to form pellets.

The pelletized mixture was dry-blended with 100 parts of polyethylene terephthalate pellets having an intrinsic viscosity of 0.63 and containing 0.3 part of titanium dioxide having an average particle diameter of 0.3 micron so that the proportion of pentaerythritol stearate was as shown in Table 1, and the mixture was melt-extruded at 280° C. to form an unstretched film. The film was stretched to 3.5 times at 80° C. in the machine direction and then at 110° C. to 3.6 times in a direction at right angles to the machine direction, and then heat-set at 200° C. for 5 seconds to give a biaxially oriented film having a thickness of 15 microns. The surface roughness and slipperiness of the resulting film were as shown in Table 1.

TABLE 1

| | Amount of pentaery-thritol stearate included (parts) | CLA ($\mu$) | Dynamic friction coefficient ($\mu_d$) |
|---|---|---|---|
| Example 1 | 0.5 | 0.010 | 0.28 |
| Example 2 | 3 | 0.009 | 0.30 |
| Comparative Example 1 | 0.005 | 0.012 | 0.87 |
| Comparative Example 2 | 7 | 0.008 | >1 |

TABLE 1-continued

| | Amount of pentaery-thritol stearate included (parts) | CLA ($\mu$) | Dynamic friction coefficient ($\mu_d$) |
|---|---|---|---|
| Example 2 | | | |

Line (I) in FIG. 2 was obtained by plotting the results of the measurement of the running friction coefficient ($\mu_k$) of the film of Example 1 ten times repeatedly. It clearly shows that even when the film of the invention was repeatedly caused to run, its slipperiness was not at all reduced.

The results of the measurement of the running friction coefficient $\mu_k$ of the film of Comparative Example 1 ten times repeatedly are plotted in curve (II) of FIG. 2. It clearly shows that the slipperiness of the film outside the scope of the invention was reduced upon repeated running.

EXAMPLE 3

One hundred parts of polyethylene terephthalate having an intrinsic viscosity of 0.60 and containing 0.10 part of calcium carbonate having an average particle diameter of 0.8 micron was dry-blended with 0.3 part of sorbitan tristearate. The mixture was melt-extruded into an unstretched film in the same way as in Example 1. The film was stretched biaxially in the same way as in Example 1 to produce a biaxially oriented film. The results are shown in Table 2.

COMPARATIVE EXAMPLE 3

The procedure of Example 3 was repeated except that sorbitan tristearate was not added. The results are shown in Table 2.

EXAMPLE 4

The procedure of Example 3 was repeated except that 0.3 part of pentaerythritol tribehenate was used instead of 0.3 part of sorbitan tristearate. The results are shown in Table 2.

COMPARATIVE EXAMPLE 4

The procedure of Example 3 was repeated except that 0.3 part of pentaerythritol trienanthoate was used instead of 0.3 part of sorbitan tristearate. The results are shown in Table 2

EXAMPLE 5

The procedure of Example 3 was repeated except that 0.3 part of pentaerythritol tetrastearate was used instead of 0.3 part of sorbitan tristearate. The results are shown in Table 2.

EXAMPLE 6

The procedure of Example 3 was repeated except that 0.3 part of arabitol dipalmitate was used instead of 0.3 part of sorbitan tristearate. The results are shown in Table 2.

COMPARATIVE EXAMPLE 5

The procedure of Example 3 was repeated except that 0.3 part of glycerol tristearate was used instead of 0.3 part of sorbitan tristearate.

COMPARATIVE EXAMPLE 6

A biaxially oriented film was produced in the same way as in Example 3 from polyethylene terephthalate having an intrinsic viscosity of 0.6 and containing 0.50 part of calcium carbonate having an average particle diameter of 0.8 micron. The results are shown in Table 2. The biaxially oriented film had sufficient slipperiness but was too rough at the surface. It could not be used as a magnetic video tape.

The results of the measurement of the film of Comparative Example 6 ten times are shown by curve (III) in FIG. 2. It is seen from this curve that the film outside the scope of this invention decreases in slipperiness as it is caused to run repeatedly.

TABLE 2

| | Calcium carbonate (parts) | Ester (B) Name | Amount (parts) | CLA ($\mu$) | Dynamic friction coefficient ($\mu_d$) |
|---|---|---|---|---|---|
| Example 3 | 0.10 | Sorbitan tristearate | 0.3 | 0.012 | 0.28 |
| Example 4 | 0.10 | Pentaerythritol tribehenate | 0.3 | 0.014 | 0.30 |
| Example 5 | 0.10 | Pentaerythritol tetrastearate | 0.3 | 0.014 | 0.29 |
| Example 6 | 0.10 | Arabitol dipalmitate | 0.3 | 0.013 | 0.31 |
| Comparative Example 3 | 0.10 | None | — | 0.012 | 0.40 |
| Comparative Example 4 | 0.10 | Pentaerythritol trienanthoate | 0.3 | 0.013 | 0.41 |
| Comparative Example 5 | 0.10 | Glycerol tristearate | 0.3 | 0.013 | 0.42 |
| Comparative Example 6 | 0.50 | None | — | 0.043 | 0.30 |

EXAMPLE 7 AND COMPARATIVE EXAMPLE 7

(1) One hundred parts of dimethyl terephthalate and 70 parts of ethylene glycol were subjected to an ester-interchange reaction in the presence of 0.09 part of calcium acetate. Then, 0.14 part of lithium acetate, 0.15 part of trimethyl phosphate and 0.02 part of phosphorous acid were added, and then 0.04 part of antimony trioxide was added as a polymerization catalyst. The ester-interchange reaction product was then polycondensed in a customary manner to give polyethylene terephthalate having an intrinsic viscosity of 0.6. The polymer was then pelletized in a customary manner.

(2) Three hundred grams of the resulting pellets were mixed with 2.7 kg of o-chlorophenol, and with stirring, the mixture was heated to 100° C. After this temperature elevation, it was left to stand for 1 hour to dissolve the polymer. The solution was then filtered through a 0–3 glass filter, and the weight of the residue on the filter was measured.

A rotor RP30 was mounted on an ultracentrifugal separator (model 40P made by Hitachi Limited), and the filtrate obtained as above was introduced into the separator at a rate of 30 cc per cell. The rotor was then rotated at 4,500 rpm. The interior of the rotor was then evacuated, and the rotating speed was increased to 30,000 rpm to separate particles by centrifugation. The separation was over in about 40 minutes. After the separation, the supernatant liquid was removed by decantation to obtain the separated particles. o-Chlorophenol at room temperature was added to the separated particles to suspend them nearly uniformly. The suspension was again treated by the ultracentrifugal separator. Finally, the resulting separated particles were vacuum-dried at 120° C. for 16 hours. The polyethylene terephthalate obtained in (1) above was found by calculation to contain 0.35% by weight of fine particles. In making this calculation, it was assumed that the balance obtained by subtracting the weight of the residue on the G-3 glass filter as measured above from 300 g was the actual amount of the polyethylene terephthalate containing the fine particles.

(3) One of the pellets obtained in (1) above was pressed between cover glasses on a hot plate at 290° C. to form a foil-like sample. The sample was observed in a dark visual field by using a polarizing microscope. Many uniform particles having an average particle diameter of 0.5 micron were located.

(4) A biaxially oriented film was produced in the same way as in Example 1 from 100 parts of the pellets obtained in (1) above and 0.5 part of sorbitan tristearate. The results are shown in Table 3.

For comparison, a biaxially oriented film was produced in the same way as above except that the sorbitan tristearate was not added (Comparative Example 7). The results are shown in Table 3.

TABLE 3

| | Fine inorganic particles | | | Dynamic friction |
|---|---|---|---|---|
| | Compound | Amount (parts) | CLA ($\mu$) | coefficient ($\mu_d$) |
| Example 7 | Sorbitan | 0.5 | 0.025 | 0.29 |
| Comparative EXAMPLE 7 | None | — | 0.024 | 0.45 |

In Example 7, the biaxially oriented film had improved slipperiness while retaining good flatness by the inclusion of the ester (B).

EXAMPLE 8

A copolyester was prepared in the same way as in Example 7 from 100 parts of dimethyl terephthalate, 60 parts of ethylene glycol and 8 part (about 5 mole% based on the dimethyl terephthalate) of 2,2'-bis(4-hydroxyethoxyphenyl)propane. It was determined in the same way as in Example 7 that the polyester contained about 0.35% by weight of uniform particles having an average particle diameter of 0.5 micron.

A biaxially oriented polyester film was prepared in the same way as in Example 7 except that 100 parts of the resulting copolyester was used instead of the polyethylene terephthalate. The film had a CLA value of 0.024$\mu$ and a dynamic friction coefficient ($\mu_d$) of 0.30.

What we claim is:

1. A biaxially oriented polyester film composed of a polyester composition comprising
   (A) 100 parts by weight of a substantially linear polyalkylene terephthalate having ethylene terephthalate as a main structural component,
   (B) 0.01 to 5 parts by weight of a partial ester of an aliphatic polyol having 4 to 6 hydroxyl groups and 5 or 6 carbon atoms in the molecule with an aliphatic monocarboxylic acid having 8 to 30 carbon atoms, and
   (C) not more than 0.8 part by weight of fine inorganic particles having an average particle diameter of not more than about 1 micron and being substantially insoluble in the polyalkylene terephthalate.

2. The film of claim 1 wherein the aliphatic polyol is erythritol, threitol, pentaerythritol, arabitol, adonitol, talitol, sorbitol, mannitol or iditol.

3. The film of claim 1 wherein the aliphatic monocarboxylic acid is linear.

4. the film of claim 1 wherein the ester (B) is a mono-, di- or tri-ester.

5. The film of claim 1 wherein the proportion of the ester (B) is 0.05 to 2 parts by weight.

6. The film of claim 1 wherein the polyalkylene terephthalate is polyethylene terephthalate.

7. A magnetic tape made of a biaxially oriented polyester film as the base material, said film being composed of a poolyester composition comprising
   (A) 100 parts by weight of polyethylene terephthalate,
   (B) 0.05 to 4 parts by weight of a partial ester of an aliphatic polyol having 4 to 6 hydroxyl groups and 5 or 6 carbon atoms in the molecule with an aliphatic monocarboxylic acid having 8 to 30 carbon atoms, and
   (C) not more than 0.5 part by weight of fine inorganic particles having an average particle diameter of not more than about 0.5 micron and being substantially insoluble in the polyethylene terephthalate.

* * * * *